United States Patent [19]
Tanser et al.

[11] Patent Number: 5,741,199
[45] Date of Patent: Apr. 21, 1998

[54] LIMITED SLIP DIFFERENTIAL RECESSED SPRING DESIGN

[75] Inventors: John H. Tanser, Punta Gorda, Fla.; George Korol, Shelby Township; John P. Walsh, Madison Hts., both of Mich.

[73] Assignee: Ford Global Technologies, Inc., Dearborn, Mich.

[21] Appl. No.: 597,135

[22] Filed: Feb. 6, 1996

[51] Int. Cl.$^6$ ........................................... F16H 3/44
[52] U.S. Cl. .................... 475/235; 475/240; 475/241
[58] Field of Search ................................ 475/230, 231, 475/233, 234, 235, 238, 239, 240, 241

[56] References Cited

U.S. PATENT DOCUMENTS

| | | | |
|---|---|---|---|
| 2,354,214 | 7/1944 | Lockwood | 475/241 X |
| 2,778,246 | 1/1957 | Thornton | 475/241 |
| 3,364,791 | 1/1968 | Truckle | 475/235 |
| 3,453,905 | 7/1969 | Schmid | 475/240 X |
| 3,580,108 | 5/1971 | Mieras | 475/231 |
| 3,650,349 | 3/1972 | Cleveland et al. | 475/231 |
| 3,657,935 | 4/1972 | O'Brien | 475/233 |
| 3,815,443 | 6/1974 | McAninch et al. | 475/235 |
| 3,929,036 | 12/1975 | Shealy | 475/234 |
| 4,245,525 | 1/1981 | LeBegue | 475/234 X |
| 4,474,080 | 10/1984 | Day | 475/231 |
| 4,594,913 | 6/1986 | Opitz | 475/235 |
| 4,732,052 | 3/1988 | Dewald | 475/231 |
| 4,949,594 | 8/1990 | Galhotra | 475/231 |
| 5,045,038 | 9/1991 | Sherlock | 475/231 |
| 5,055,095 | 10/1991 | Osenbaugh et al. | 475/231 |
| 5,061,089 | 10/1991 | Bair et al. | 384/535 |
| 5,520,589 | 5/1996 | Dewald et al. | 475/231 |

FOREIGN PATENT DOCUMENTS

| | | | |
|---|---|---|---|
| 35800 | 3/1954 | Poland | 475/235 |
| 1260168 | 1/1972 | United Kingdom | 475/241 |

*Primary Examiner*—Khoi Q. Ta
*Attorney, Agent, or Firm*—James J. Dottavio

[57] ABSTRACT

A limited slip differential having a housing with a recess provided in a radial surface of the housing adjacent a clutch pack disposed between the housing and side gear of the differential. A biasing member is provided in the recess to induce frictional engagement of the clutch.

12 Claims, 1 Drawing Sheet

LIMITED SLIP DIFFERENTIAL RECESSED SPRING DESIGN

BACKGROUND OF THE INVENTION

1. Field of the Invention

This invention relates to a differential assembly, and more particularly to a biasing means which induces frictional engagement of a clutch in a differential assembly.

2. Description of the Prior Art

In a limited slip differential, clutch assemblies provide the required slip-limiting properties. As shown in U.S. Pat. No. 5,045,038 to Sherlock ('038), a conventional limited slip differential generally comprises a housing rotatable about an axis, encasing two bevel side gears coaxial with the housing and intermeshing with beveled pinion gears which are supported in the housing on an axis perpendicular the axis of the side gears. Between the housing and the side gears are interposed respective clutch assemblies. Belleville springs are provided to urge the side gears away from one another to induce frictional engagement of the clutch assemblies.

The Belleville springs of the Sherlock '038 patent urge the side gears axially away from meshing engagement with the beveled pinion gears. As the clutch plates wear, the amount of engagement between the gears is reduced. Furthermore, the Belleville spring could become fully compressed upon axial movement of a gear from the gear separation forces, thereby damaging the Belleville spring and therefore changing the spring force acting upon the side gears and hence upon the clutch pack, consequently affecting the differential function.

It would therefore be desirable to provide a biasing means which induces frictional engagement of a clutch assembly in a limited slip differential assembly while promoting engagement of the side gears with the pinion gears, further having means to protect the biasing means from being damaged.

SUMMARY OF THE INVENTION

It is an object of the present invention to provide a biasing means for the clutch in a limited slip differential which induces optimal frictional engagement of the clutch and which urges correct gear mesh of the side gears with the pinion gears. It is a further object to provide a means to prevent damage to the biasing spring due to gear separating forces.

A limited slip differential according to the present invention includes a housing having a recess in a radial surface of the housing adjacent clutch packs disposed between the housing and side gears of the differential. A biasing member is provided in the recess to induce frictional engagement of the clutch.

DESCRIPTION OF THE PREFERRED EMBODIMENTS

Figure 1:
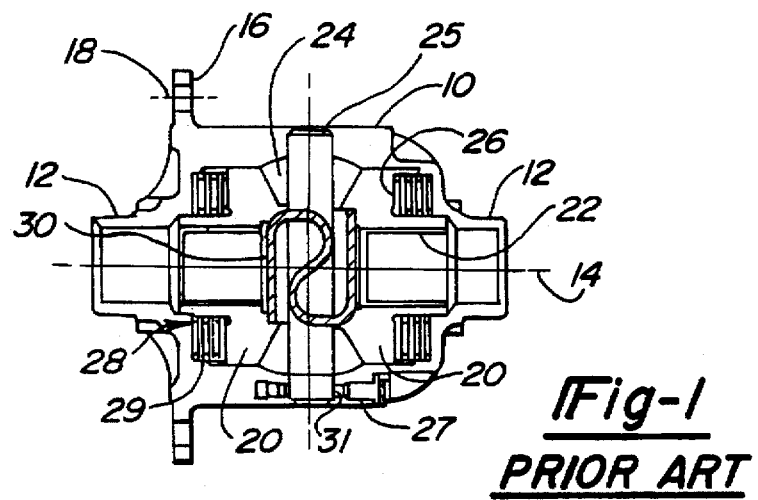
FIG. 1 is a cross-sectional view of a prior art limited slip differential.

Referring to FIG. 1, the illustrated prior art differential comprises a housing 10 having opposing axial spigots 12 at either end. The spigots 12 are provided to mount the housing 10 for rotation about an axis 14 on bearings (not shown) supported by an axle casing (not shown). The housing 10 has an external flange 16 with circumferentially spaced holes 18 for attachment by bolts to a bevel gear (not shown). The bevel gear meshes with an input pinion drivably connected to the driveline of a motor vehicle (not shown).

Inside the housing 10, two bevel side gears 20 are provided which are supported for rotation about the axis 14 of the housing 10. The bevel side gears 20 are supported rotatably relative to the housing 10. The side gears 20 have a splined connection 22 to respective half shafts (not shown) which extend into the housing 10 through the spigots 12.

Bevel pinion gears 24 are provided in meshing engagement with the side gears 20. The pinion gears 24 are supported on a shaft member 25 which extends transversely across the housing 10 perpendicular to the axis of rotation 14. The pinions 24 are rotatable about the axis of the shaft member 25. The shaft 25 member is retained to the housing 10 in a known manner. In the preferred embodiment shown in FIG. 2, the shaft 25' is retained by a fastener 27' threaded into the housing 10'. The fastener 27' includes a portion which extends through an aperture 31' provided in the shaft 25'.

The side gears 20' have a radial surface 26' provided adjacent the housing 10'. Between the housing 10' and the radial surface 26' of the side gears 20' are provided respective clutch packs 28' comprising alternating interleaved annular clutch plates 29' mounted for unitary rotation with the housing 10' and side gears 20' respectively. As is well known in the art, the clutch plates comprise friction plates and reaction plates. A splined connection between each clutch plate 29' and the side gear 20' or housing 10' provides for axial slideable movement therebetween. When the clutch pack 28' is compressed, torque is frictionally transmitted between the housing 10' and side gear 20'.

As shown in FIG. 1, to maintain desired preload or bias on the interleaved clutch plates 29, the prior art design uses an s-shaped spring 30 disposed between the side gears 20. The spring 30 forces each side gear 20 outward against a respective clutch pack 28, thereby compressing the clutch pack 28 between the side gear 20 and the housing 10 for frictional driving engagement. The force from the biasing spring 30 provides a minimum engaging force between the clutch plates 29 to retard the relative rotational movement between each side gear 20 and the housing 10, and between the side gears 20 themselves. The spring 30 urges the side gears 20 outward away from the pinion gears 24. As the clutch disks 29 wear, the side gears 20 are urged further outward, causing improper gear tooth separation and improper gear action between the pinion gears 24 and the side gears 20, resulting in gear wear and failure.

The prior art differential shown in FIG. 1 functions in a known manner as a limited slip differential. The spring 30 forces the clutch disks 29 into compression thereby resisting excessive slip of one of the differential output shafts relative to the other output shaft (not shown). The force exerted on the clutch 28 by the spring 30 is augmented by the separating forces resulting from the nature of the engagement between the bevel side gears 20 and the pinion gears 24. To increase the frictional resistance of the clutch pack 28 in proportion to the input torque thereto, the pinion gears 24 and side gears 20 are provided with a positive pressure angle on the teeth provided thereon. Thus, in response to a torque input to the differential unit, the side gears 20 will be urged axially outward, further compressing the interleaved disks 29 of the clutch 28, thereby further retarding relative rotation between the side gears 20 and the case 10, and between the side gears 20 themselves.

Figure 2:
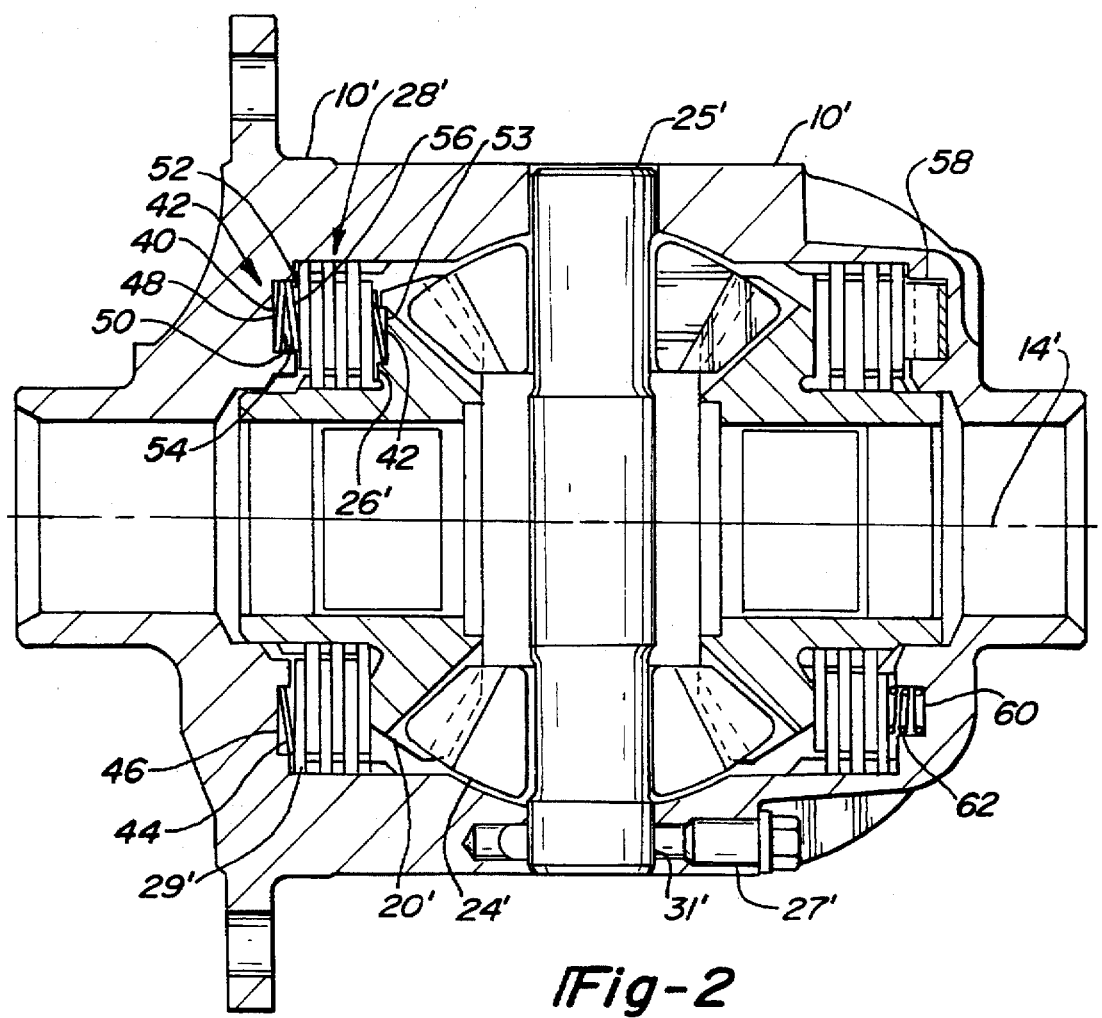
FIG. 2 is a cross-sectional view of a limited slip differential according to the present invention.

In the preferred embodiment shown in FIG. 2, many components are similar to those provided as in the prior art differential of FIG. 1, and are therefore designated in the prime. FIG. 2 represents four embodiments of the present invention; one embodiment is shown at each quarter section of the differential between the clutch pack and the housing.

In the preferred embodiments shown in FIG. 2, an annular recess 40 is provided in the housing 10' adjacent the clutch pack 28'. The recess 40 may be provided by any known means, such as machining or casting. Provided within the recess 40 is a biasing means 42. The biasing means 42 in the preferred embodiment shown in the lower left hand quarter of FIG. 2 comprises an annular Belleville spring 44 provided in the recess 40 coaxial with the differential housing 10'. As shown in FIG. 2, the Belleville spring is provided between the bottom of the recess 46 and the clutch plate 29' closest the housing.

The urging of the biasing means 42 against the clutch pack 28' increases frictional resistance within the clutch pack 28', and in the preferred embodiments, forces the bevel side gears 20' into engagement with the bevel pinion gears 24'. This engagement promotes better gear durability and reduced backlash within the gear sets because the direction of the forces promote correct gear mesh. This engagement provides a driving engagement through the clutch plates 29' from the housing 10' to the side gears 20'.

In the preferred embodiment, as shown in the lower left hand quarter of FIG. 2, the clutch plate 29' closest the housing 10' is splined to the housing 10' and rotates therewith, thereby preventing substantial relative rotation between the spring 44 and the clutch plate 29' to prevent wear of the spring 44 or the plate 29' from such relative rotation.

The recess 40 of the preferred embodiment is designed so that when the side gear 20' is forced against the clutch 28' and the spring 44 is compressed, the clutch plate 29' closest the housing 10' will contact the housing 10', thereby preventing further travel of the clutch plate 29' and thereby preventing further compression of the spring 44 and damage thereto due to the gear separating forces. The axial thickness of the Belleville spring in an uncompressed state allows the spring to project from the recess 40 and contact the clutch plate 29'. In any of the preferred embodiments shown in FIG. 2, the width and depth of the recess 40, as well as the characteristics of the biasing means 42, are dependent upon the application in which the differential assembly is used and the optimized biasing force required.

The force exerted on the clutch packs 28' and the side gears 20' may be altered by modifying the biasing means 42. Examples of modifications include increasing the spring rate by conventional means, such as providing a thicker Belleville spring 44. Alternatively, two Belleville springs could be provided, as shown in the upper left hand quarter of FIG. 2. The two Belleville springs could have parallel abutting conical surfaces, or by using intersecting conical surfaces as shown in the upper left hand quarter of FIG. 2, wherein a first spring is provided with a first surface 48 abutting the bottom of the recess 46 and a second surface 50 displaced axially from the bottom of the recess 46 adjacent a second Belleville spring 52. The second Belleville spring 52 has a first surface 54 abutting the second surface 50 of the first Belleville spring and has a second surface 56 axially displaced from the first surface 54 abutting the clutch plate 29'. The springs may be identical to provide a constant spring rate, or could have differing spring rates to provide a variable spring rate based on compression of the two springs. Additionally, the depth of the recess 40 may be modified to effect the travel of the spring.

Various modifications of the Biasing means 42 could be provided, such as an annular wavy spring washer 58 as shown in the upper right hand quarter of FIG. 2. An alternate design provides a plurality of axial recesses 60 circumferentially spaced about the axis 14' of the housing 10' provided with a helical spring 62 in each of the recesses 60 to urge the clutch pack 28' from the housing 10'. The recesses 60 are blind holes having a bottom surface to engage the end of the spring 62. A further alternate design uses a resilient material in an annular member (not shown), such as a rubber material provided in an annular recess 40 in place of the springs shown in the above preferred embodiments.

Furthermore, various combinations of the above embodiments of biasing means could be provided (not shown), such as the combination of a Belleville spring with an annular wavy washer. Such embodiments may more easily provide variable spring rates. For example the annular washer could have a low spring rate so the annular washer would first be compressed then the spring rate of the Belleville spring would provide greater resistance to the clutch pack.

A further alternate embodiment provides a recess 53 in the radial surface 26' of the side gear 20' adjacent the annular clutch plates 29', as shown in the upper left hand quarter of FIG. 2. In this embodiment the plate 29' adjacent the side gear 20' is splined to the side gear 20'. Within the recess a biasing means 42 is provided to urge the clutch plates 29' from the radial surface 26' of the side gear 20' and into frictional engagement. Although the upper left hand quarter of FIG. 2 shows a biasing means in both the pinion gear 24' and housing 10', the preferred embodiment uses only the biasing means in the housing without a biasing means in the pinion gear. However, such a combination as shown could be used to produce a variable spring rate as described above.

Although the preferred embodiments of the present invention have been disclosed, various changes and modifications may be made without departing from the scope of the invention as set forth in the appended claims.

What is claimed is:

1. A limited slip differential having a housing supported for rotation about an axis, first and second side gears provided in the housing, and clutch means provided between the housing and the first side gear, comprising:

a clutch pack having multiple clutch plates provided between the housing and the first side gear, a first one of said clutch plates fixed to the side gear and a second one of said clutch plates fixed to said housing;

the first side gear having a first radial surface adjacent the housing;

the housing having a second radial surface with an annular groove provided therein adjacent the first side gear; and a biasing means provided in said annular groove for urging the clutch plates into mutual frictional engagement, said biasing means having an uncompressed axial thickness and a compressed axial thickness whereat the biasing means is damaged, and the groove has an axial depth less than the uncompressed axial thickness of the biasing means and greater than the compressed axial thickness of the biasing means.

2. A limited slip differential having a housing supported for rotation about an axis, first and second side gears provided in the housing, and clutch means provided between the housing and the first side gear, comprising:

a clutch pack having multiple clutch plates provided between the housing and the first side gear, a first one of said clutch plates fixed to the side gear and a second one of said clutch plates fixed to said housing;

the first side gear having a first radial surface having an annular groove provided therein adjacent the housing;

the housing having a second radial surface adjacent the first side gear; and a biasing means selected from the group comprising a Belleville spring, a wavy washer and a compressible annular material positioned within the groove for urging the clutch plates into mutual frictional engagement, said biasing means having an uncompressed axial thickness and a compressed axial thickness whereat the biasing means is damaged, and the groove has an axial depth less than the uncompressed axial thickness of the biasing means and greater than the compressed axial thickness of the biasing means.

3. A limited slip differential according to claim 1, wherein the biasing means comprises a Belleville spring.

4. A limited slip differential according to claim 3 wherein the depth of the groove enables the Belleville spring to be compressed within a range within which said spring has a substantially constant spring force during compression and wherein said clutch plates drivably engage the housing when said spring is compressed substantially within said groove.

5. A limited slip differential according to claim 1, wherein the biasing means comprises a wavy washer.

6. A limited slip differential according to claim 5 wherein the depth of the groove enables the wavy washer to be compressed within a range within which said wavy has a substantially constant spring force during compression and wherein said clutch plates drivably engage the housing when said wavy washer is compressed substantially within said groove.

7. A limited slip differential according to claim 1, further comprising a pinion gear in driving engagement with the side gear, wherein the axial travel of said side gear toward said pinion gear is limited only by engagement with said pinion gear.

8. A limited slip differential according to claim 7, wherein the biasing means comprises a Belleville spring.

9. A limited slip differential according to claim 8, wherein the depth of the groove enables the Belleville spring to be compressed within a range within which said spring has a substantially constant spring force during compression and wherein said clutch plates drivably engage the housing when said spring is compressed substantially within said groove.

10. A limited slip differential according to claim 2, wherein the biasing means comprises a wavy washer.

11. A limited slip differential according to claim 10, wherein the depth of the groove enables the wavy washer to be compressed within a range within which said wavy washer has a substantially constant spring force during compression and wherein said clutch plates drivably engage the housing when said wavy washer is compressed substantially within said groove.

12. A limited slip differential according to claim 11, further comprising a pinion gear in driving engagement with the side gear, wherein the axial travel of said side gear toward said pinion gear is limited only by engagement with said pinion gear.

* * * * *

UNITED STATES PATENT AND TRADEMARK OFFICE
CERTIFICATE OF CORRECTION

PATENT NO. : 5,741,199
DATED      : April 21, 1998
INVENTOR(S) : Tanzer et al.

It is certified that error appears in the above—identified patent and that said Letters Patent is hereby corrected as shown below:

On title page, items [19] and [75],
The correct spelling of the inventor's name is "Tanzer" not Tanser.

Signed and Sealed this

Twenty-third Day of March, 1999

Q. TODD DICKINSON

Attest:

Attesting Officer        Acting Commissioner of Patents and Trademarks